US012630359B2

(12) United States Patent
Takahashi et al.

(10) Patent No.: US 12,630,359 B2
(45) Date of Patent: May 19, 2026

(54) ARTICLE TRANSPORT SYSTEM WITH TRANSPORT VEHICLE FOR UNMANNED AIRCRAFT

(71) Applicant: Daifuku Co., Ltd., Osaka (JP)

(72) Inventors: Toyoki Takahashi, Komaki (JP);
Keisuke Takeno, Komaki (JP); Satoshi Nitta, Komaki (JP); Hidemoto Fukushima, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 178 days.

(21) Appl. No.: 18/371,073

(22) Filed: Sep. 21, 2023

(65) Prior Publication Data

US 2024/0101288 A1    Mar. 28, 2024

(30) Foreign Application Priority Data

Sep. 22, 2022    (JP) ................................. 2022-151084

(51) Int. Cl.
| | |
|---|---|
| *B65G 1/02* | (2006.01) |
| *B60L 53/16* | (2019.01) |
| *B64U 10/60* | (2023.01) |
| *B64U 70/92* | (2023.01) |
| *B64U 80/10* | (2023.01) |
| *B64U 80/25* | (2023.01) |

(Continued)

(52) U.S. Cl.
CPC .............. *B65G 1/026* (2013.01); *B60L 53/16* (2019.02); *B64U 10/60* (2023.01); *B64U 70/92* (2023.01); *B64U 80/10* (2023.01);

*B64U 80/25* (2023.01); *B65G 35/06* (2013.01); *B60L 2200/10* (2013.01); *B64U 2101/60* (2023.01)

(58) Field of Classification Search
CPC ............ B64U 2101/70; B64U 2101/66; B64U 80/10; B64U 80/40; B64U 80/80; B64U 70/92; B64U 70/93; B64F 3/00; B64F 3/02; B64C 39/022; G05D 1/0866; G05D 1/467; G05D 1/678

See application file for complete search history.

(56) References Cited

U.S. PATENT DOCUMENTS

| | | | | |
|---|---|---|---|---|
| 10,029,803 | B1 * | 7/2018 | Larsen | B64F 3/02 |
| 12,054,251 | B2 * | 8/2024 | Kanda | B64U 70/30 |

(Continued)

FOREIGN PATENT DOCUMENTS

| | | |
|---|---|---|
| JP | 2018529571 A | 10/2018 |
| JP | 2020514173 A | 5/2020 |
| JP | 2020152212 A | 9/2020 |

*Primary Examiner* — Richard Green
(74) *Attorney, Agent, or Firm* — The Webb Law Firm

(57) ABSTRACT

A transport system includes an unmanned aircraft including an article holding section; and a transport vehicle that includes at least one aircraft holding section configured to hold the unmanned aircraft, and that is configured to travel along a predetermined travel path, wherein the at least one aircraft holding section 44 is further configured to (i) hold the unmanned aircraft in either one of an article holding state in which the unmanned aircraft is holding the article W using the article holding section, and an article non-holding state in which the unmanned aircraft is not holding the article W using the article holding section, and (ii) allow the unmanned aircraft in either one of the article holding state and the article non-holding state to take off and land.

17 Claims, 9 Drawing Sheets

(51) Int. Cl.
 B64U 101/60 (2023.01)
 B65G 35/06 (2006.01)

(56) References Cited

U.S. PATENT DOCUMENTS

| 2016/0009413 A1* | 1/2016 | Lee | ........................ | B64U 70/90 |
| | | | | 244/114 R |
| 2016/0196756 A1* | 7/2016 | Prakash | ................. | B64U 80/25 |
| | | | | 701/3 |
| 2017/0081043 A1 | 3/2017 | Jones et al. | | |
| 2018/0155027 A1* | 6/2018 | Gil | ........................ | B64U 80/10 |
| 2019/0043371 A1 | 2/2019 | Evan | | |
| 2019/0084674 A1 | 3/2019 | Jones et al. | | |
| 2025/0136374 A1* | 5/2025 | Jeong | .................... | B64U 80/80 |

* cited by examiner

ARTICLE TRANSPORT SYSTEM WITH TRANSPORT VEHICLE FOR UNMANNED AIRCRAFT

CROSS-REFERENCE TO RELATED APPLICATION

This application claims priority to Japanese Patent Application No. 2022-151084 filed Sep. 22, 2022, the disclosure of which is hereby incorporated by reference in its entirety.

BACKGROUND OF THE INVENTION

1. Field of the Invention

The present invention relates to a transport system including an unmanned aircraft and a transport vehicle.

2. Description of Related Art

A transport system including an unmanned aircraft and a transport vehicle is known. In the following, the reference numerals shown in parentheses in Description of the Related Art are those of JP 2020-514173A (Patent Document 1). FIGS. 4A to 4D of Patent Document 1 disclose a transport system including an article (40) and a transport vehicle (450) including an unmanned aircraft (470).

However, the transport vehicle (450) of the transport system according to Patent Document 1 is configured in such a manner that the unmanned aircraft (470) and the article (40) are separately stored, and an item engagement system (458) loads the article (40) into the unmanned aircraft (470) located on a launch and retrieval system (452). Accordingly, for example, each time the transport vehicle (450) moves, it is necessary to separately store the unmanned aircraft (470) and the article (40), and upon reaching a destination, load the article (40) into the unmanned aircraft (470), using the item engagement system (458) and the launch and retrieval system (452), which results in the problem of low transport efficiency.

SUMMARY OF THE INVENTION

Therefore, there is a desire to realize a transport system that includes a transport vehicle configured to hold an unmanned aircraft, and that has high transport efficiency of articles using the unmanned aircraft.

A transport system according to the present disclosure includes: an unmanned aircraft including an article holding section configured to hold and release an article; and a transport vehicle that includes at least one aircraft holding section configured to hold the unmanned aircraft, and that is configured to travel along a predetermined travel path, wherein the at least one aircraft holding section is further configured to (i) hold the unmanned aircraft in either one of an article holding state in which the unmanned aircraft is holding the article using the article holding section, and an article non-holding state in which the unmanned aircraft is not holding the article using the article holding section, and (ii) allow the unmanned aircraft in either one of the article holding state and the article non-holding state to take off and land.

With this configuration, the article can be transported from the transport vehicle to a destination using the unmanned aircraft, and therefore the article can also be transported to a destination away from the travel path of the transport vehicle. To put it conversely, there is no need to provide the travel path of the transport vehicle in proximity to all assumed destinations. Accordingly, it is possible to reduce the cost of installing the travel path, and increase the efficiency of transporting the article and the unmanned aircraft using the transport vehicle. In the case of transporting the article to a destination, the unmanned aircraft in the article holding state is held on the transport vehicle, and the transport vehicle is caused to travel to the vicinity of the destination, from where the unmanned aircraft is caused to take off while being in the article holding state, thus transporting the article to the destination. In this manner, the unmanned aircraft in the article holding state can be held on the transport vehicle, and it is therefore possible to easily shorten the time from the arrival of the transport vehicle at the vicinity of the destination to the takeoff of the unmanned aircraft. Accordingly, it is possible to increase the efficiency of transporting the article. Also, the unmanned aircraft that has transported the article to the destination is thereafter held on the transport vehicle again, whereby the unmanned aircraft can be transported to a different location, including, for example, a receiving location of the article.

BRIEF DESCRIPTION OF THE DRAWINGS

FIG. 3 is an enlarged view showing an aircraft holding section and an unmanned aircraft shown in FIG. 1.

FIG. 12 is a diagram showing upper surfaces of aircraft holding sections shown in FIG. 11.

DESCRIPTION OF THE INVENTION

First Embodiment

Figure 1:
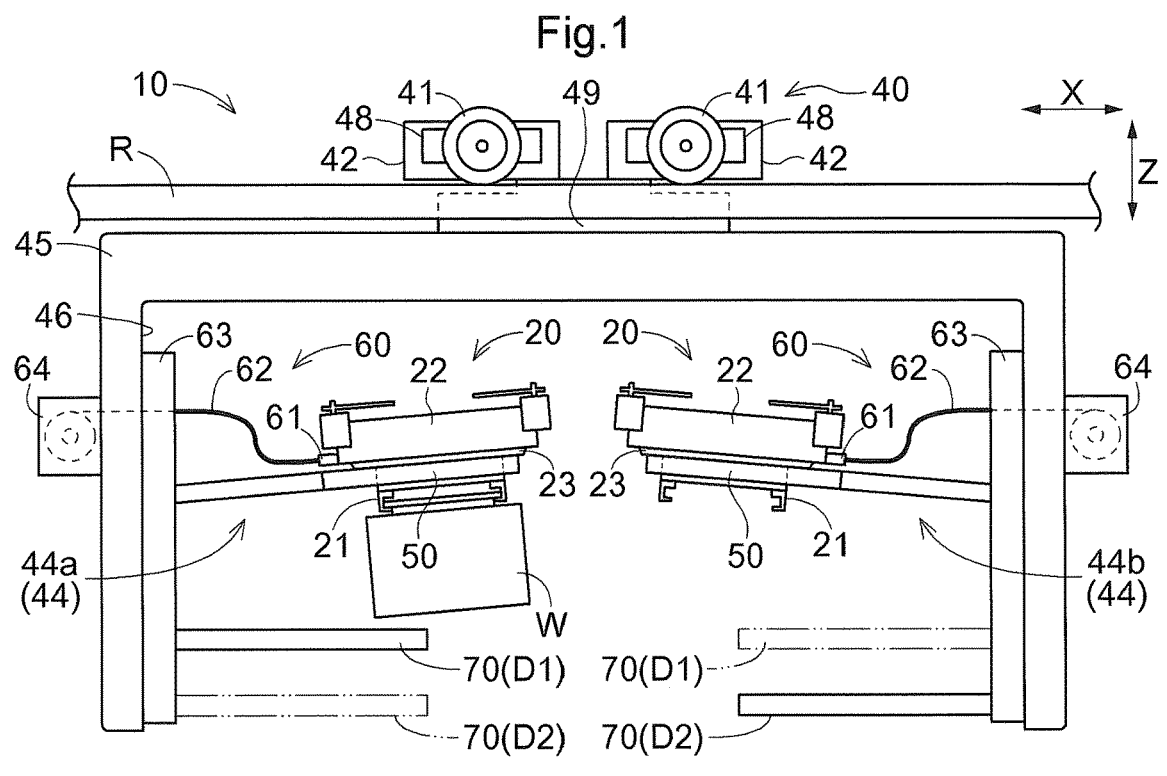
FIG. 1 is a side view of a transport system according to a first embodiment.
Figure 2:
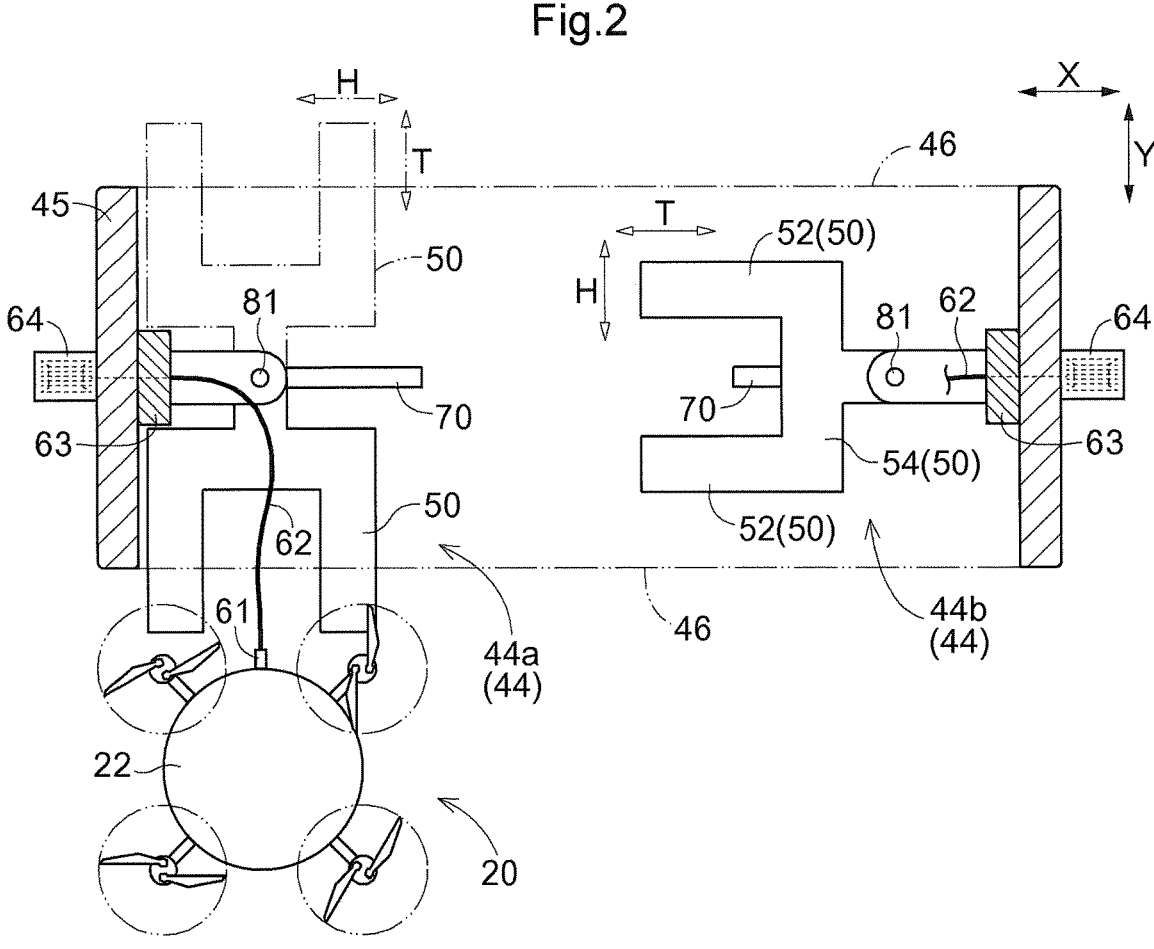
FIG. 2 is a diagram showing upper surfaces of aircraft holding sections shown in FIG. 1.

In the following, a transport system 10 according to a first embodiment will be described with reference to the drawings. The transport system 10 includes unmanned aircraft 20 and a transport vehicle 40. FIG. 1 is a side view of the transport system 10 according to the present embodiment. FIG. 2 is a diagram showing upper surfaces of aircraft holding sections 44 included in the transport vehicle 40.

Figure 3:
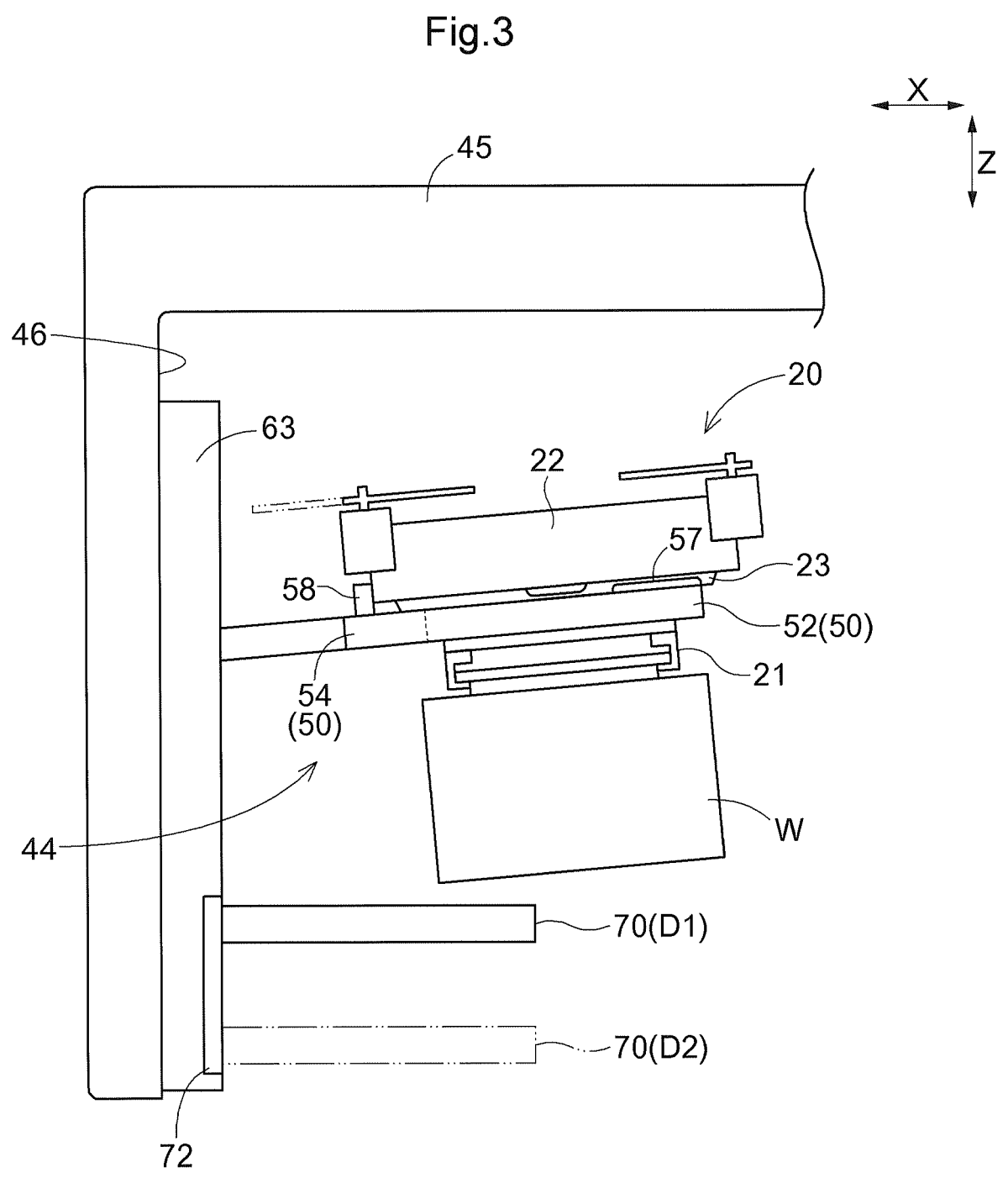

FIG. 3 is an enlarged view showing side surfaces of an unmanned aircraft 20 and an aircraft holding section 44.

In the present embodiment, each unmanned aircraft 20 includes an article holding section 21 configured to holding and release an article W. Examples of the unmanned aircraft 20 include a fixed-wing aircraft and a rotary-wing aircraft that are remotely operable or capable of autonomous flight. In the present embodiment, the unmanned aircraft 20 is an electrically powered rotary-wing aircraft capable of vertical takeoff and landing. Preferably, the unmanned aircraft 20 is a multicopter (so-called drone) capable of autonomous flight. Also preferably, the unmanned aircraft 20 is a wired rotary-wing aircraft to which power is supplied via a power feeding line 62, which will be described later, from a power supply section 63 included in the transport vehicle 40.

The unmanned aircraft 20 includes a body 22 located above the article W held by the article holding section 21. The body 22 is a portion for realizing flight functionality of the unmanned aircraft 20. The body 22 includes a mechanism configured to generate propelling force and lift force. The body 22 includes, for example, rotary wings, and an electric motor that drives the rotary wings. In addition, the article holding section 21 is configured to hold the article W in a suspended state. Here, an article holding state is a state in which the unmanned aircraft 20 is holding the article W using the article holding section 21, and an article non-holding state is a state in which the unmanned aircraft 20 is not holding the article W using the article holding section 21.

In the present embodiment, the transport vehicle 40 travels along a predetermined travel path R. The transport vehicle 40 includes travel sections 42 each including wheels 41. Examples of the transport vehicle 40 include an automated guided vehicle that is remotely operable or capable of autonomous travel, and that travels along a travel path R provided on an indoor or outdoor path, and a tracked carriage that travels along a travel path R formed by rails installed on a floor or a ceiling. In the present embodiment, the transport vehicle 40 is an overhead transport vehicle that travels along a travel path R installed along a ceiling in a room. Here, a vertical direction Z is a direction extending in a vertical direction, a traveling direction X is a direction extending along the travel path R, and a width direction Y is a direction orthogonal to the traveling direction X in a vertical view.

In the present embodiment, the transport vehicle 40 includes at least one aircraft holding section 44 that holds an unmanned aircraft 20. The aircraft holding section 44 is configured to (i) hold the unmanned aircraft 20 in either one of the article holding state and the article non-holding state, and (ii) allow the unmanned aircraft 20 in either one of the land article holding state and the article non-holding state to take off and land.

In the present embodiment, the transport vehicle 40 includes a housing section 45 that houses the unmanned aircraft 20 held by the aircraft holding section 44. The housing section 45 is disposed below the travel section 42. In the illustrated example, the housing section 45 has, on both sides in the width direction Y, openings 46 through which the unmanned aircraft 20 passes while performing takeoff and landing.

In the present embodiment, the aircraft holding section 44 of the transport vehicle 40 includes a support member 50 configured to support, from below, the body 22 at a position located above the article W held by the article holding section 21. Here, a relative movement direction T is a direction in which the unmanned aircraft 20 moves relative to the support member 50 while performing takeoff and landing, and a relative movement orthogonal direction H is a direction orthogonal to the relative movement direction T in a vertical view. The body 22 of the unmanned aircraft 20 includes a supported section 23 configured to be supported by the support member 50.

In the present embodiment, as shown in FIGS. 2 and 3, the support member 50 of the aircraft holding section 44 includes a pair of insertion sections 52, and a coupling section 54 coupling the insertion sections 52 to each other. The insertion sections 52 are inserted between the article W and the supported section 23 in the vertical direction Z. As shown in FIG. 2, each of the insertion sections 52 extends in the relative movement direction T, and the insertion sections 52 are coupled to each other by the coupling section 54 in such a manner as to be spaced apart from each other in the relative movement orthogonal direction H. This configuration makes it possible to move the unmanned aircraft 20 relative to the support member 50 in such a manner that the article holding section 21 located below the supported section 23 is sandwiched between the insertion sections 52, whereby the supported section 23 of the unmanned aircraft 20 can be supported by the support member 50.

In the present embodiment, as shown in FIG. 3, the pair of insertion sections 52 are inclined in such a manner as to be higher on a distal end side, in the relative movement direction T, of the support member 50, which is a side where the unmanned aircraft 20 exists and enters during takeoff and landing. In addition, each of the insertion sections 52 includes a distal end-side restricting section 57 that restricts the unmanned aircraft 20 held by the aircraft holding section 44 from moving toward the distal end side of the support member 50. In the illustrated example, the distal end-side restricting section 57 is a protrusion formed on an upper surface of each of the insertion sections 52. The support member 50 includes a proximal end-side restricting section 58 that restricts the unmanned aircraft 20 held by the aircraft holding section 44 from moving toward a proximal end side of the support member 50. In the present embodiment, the proximal end-side restricting section 58 prevents the rotary wings of the unmanned aircraft 20 from coming into contact with the housing section 45.

Referring back to FIG. 1, in the present embodiment, each of the travel sections 42 of the transport vehicle 40 includes wheels 41, and an electric motor 48 that drives the wheels 41. In addition, the transport vehicle 40 includes a regenerative power recovery section 49 configured to recover power obtained by regenerative braking of the electric motor 48 during deceleration of the travel sections 42, and at least one power feeding section 60 configured to supply power to the unmanned aircraft 20 held by the aircraft holding section 44. The power recovered by the regenerative power recovery section 49 is supplied to the unmanned aircraft 20 from the power feeding section 60. In the present embodiment, the transport vehicle 40 includes at least one power feeding line 62 including a connection section 61 configured to be connected to the unmanned aircraft 20, at least one power supply section 63 configured to supply power to the unmanned aircraft 20 via the power feeding line 62, and at least one winding device 64 configured to wind and unwind the power feeding line 62. The winding device 64 limits the unwinding length of the power feeding line 62 to a predetermined length. In this manner, it is possible to constantly supply power to the unmanned aircraft 20 by supplying power to the unmanned aircraft 20 via the power feeding line 62, thus ensuring a long flight time of the unmanned aircraft 20. In the illustrated example, the connection section 61, the power feeding line 62, the power supply section 63, and the winding device 64 constitute the power feeding section 60.

In the present embodiment, the transport vehicle 40 includes at least one fall restriction member 70 that is disposed at a position located below the article W held by the article holding section 21 and overlapping the article W in a vertical view, and that restricts falling of the article W. As shown in FIG. 3, the transport vehicle 40 includes at least one orientation changing mechanism 72 configured to change an orientation of the fall restriction member 70 between a restricting orientation D1 in which the fall restriction member 70 restricts falling of the article W held by the article holding section 21 of the unmanned aircraft 20, and a withdrawn orientation D2 in which the fall restriction member 70 does not interfere with the unmanned aircraft when takeoff and landing of the unmanned aircraft 20 are performed.

In the present embodiment, the orientation changing mechanism 72 changes the orientation of the fall restriction member 70 between the restricting orientation D1 and the withdrawn orientation D2 by moving the fall restriction member 70 in the vertical direction Z. This configuration makes it possible to easily restrict falling of articles W located at different heights. In the example shown in FIG. 1, the fall restriction member 70 is spaced away from the article W in the restricting orientation D1. However, the fall restriction member 70 may abut against the article W in the restricting orientation D1. Also, the orientation of the fall restriction member 70 may be changed between the restricting orientation D1 and the withdrawn orientation D2 by moving or turning the fall restriction member 70 in the horizontal direction rather than the vertical direction Z. A holding portion that holds the article W by sandwiching side surfaces thereof may be provided in addition to, or in place of the fall restriction member 70.

In the present embodiment, as shown in FIG. 2, the transport vehicle 40 includes at least one holding section movement mechanism 81 that moves the aircraft holding section 44 in at least the horizontal direction. In the illustrated example, the holding section movement mechanism 81 is configured to cause the aircraft holding section 44 to pivot about a pivot shaft provided on the proximal end side of the support member 50. Thus, the relative movement direction T can be changed to, for example, a direction in which the unmanned aircraft 20 can take off or land more easily while the transport vehicle 40 is traveling than while the transport vehicle 40 is stopped. In the present embodiment, the holding section movement mechanism 81 causes the aircraft holding section 44 to swing to enable the unmanned aircraft 20 to perform takeoff and landing on both sides in the width direction Y. In the illustrated example, the holding section movement mechanism 81 also serves as an extension and retraction mechanism 82, which will be described later.

Figure 4:
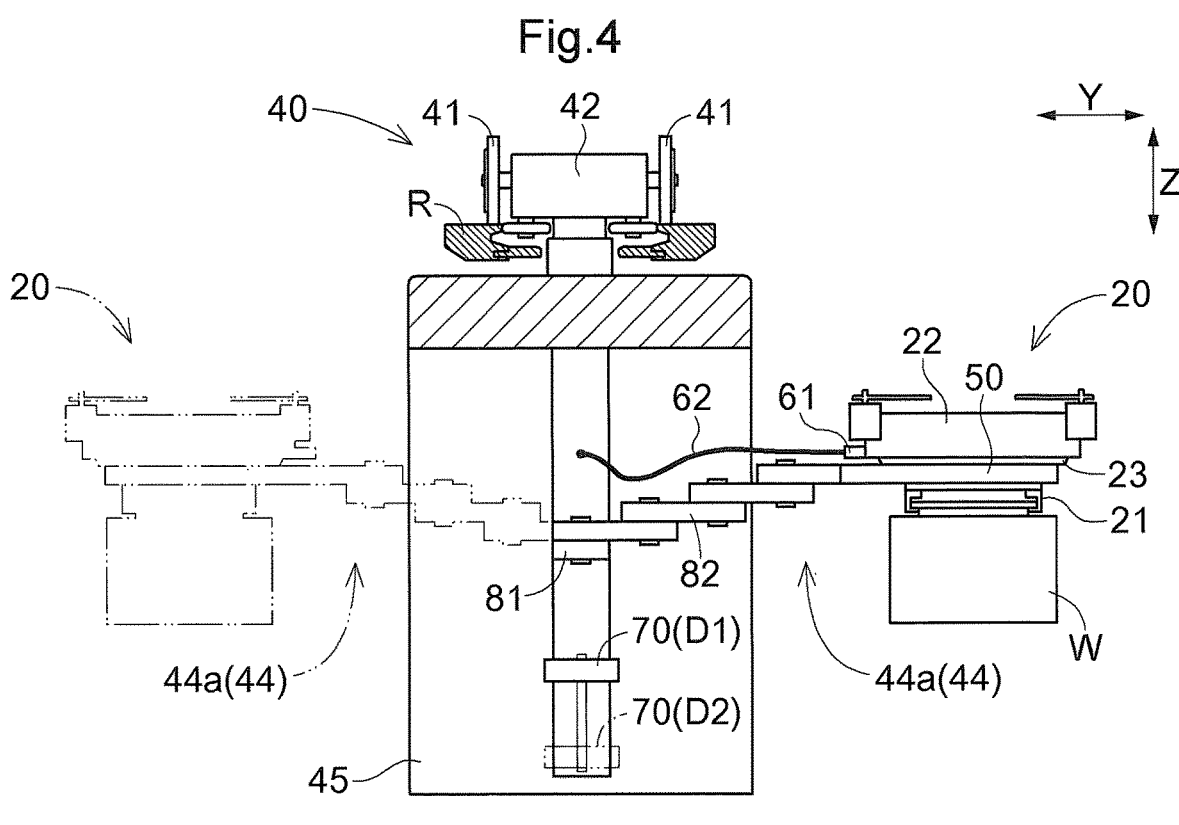
FIG. 4 is a diagram showing an extension and retraction mechanism of the transport system shown in FIG. 1.

FIG. 4 is a Y-Z sectional view of the transport system 10 according to the present embodiment. In the present embodiment, the transport vehicle 40 includes at least one extension and retraction mechanism 82 configured to cause the aircraft holding section 44 to extend and retract in at least the horizontal direction. With this configuration, even if a portion of the transport vehicle 40 is disposed in such a manner as to cover an upper side of the aircraft holding section 44 in a retracted state, the aircraft holding section 44 can be brought into a protruding state in which at least a distal end of the aircraft holding section 44 protrudes at a position that does not overlap the housing section 45 in a vertical view. Accordingly, it is possible to easily perform takeoff and landing of the unmanned aircraft 20. The retracted state is a state in which the aircraft holding section 44 and the unmanned aircraft 20 held by the aircraft holding section 44 are housed at a position at which the aircraft holding section 44 and the unmanned aircraft 20 do not protrude from the housing section 45 in a vertical view, for example, in order to cause the transport vehicle 40 to travel. Examples of the extension and retraction mechanism 82 include a horizontal articulated robot (SCARA), and a diamond grid-shaped, fitting, or slidable expansion and contraction device that causes the aircraft holding section 44 to expand and contract in at least the horizontal direction.

In the present embodiment, the transport vehicle 40 includes the holding section movement mechanism 81 configured to cause the aircraft holding section 44 to pivot, and the extension and retraction mechanism 82 configured to cause the aircraft holding section 44 to extend and retract in at least the horizontal direction. This configuration makes it possible to cause the aircraft holding section 44 protrude after causing the aircraft holding section 44 to pivot in a direction in the horizontal direction in which the takeoff and landing of the unmanned aircraft 20 can be easily performed.

In the present embodiment, the transport vehicle 40 includes a plurality of aircraft holding sections 44 arranged in the traveling direction X. In the illustrated example, the transport vehicle 40 includes a first aircraft holding section 44a that is a first one of the aircraft holding sections arranged in the traveling direction X, and a second aircraft holding section 44b that is a second one of the aircraft holding sections. The first aircraft holding section 44a is configured to enable the unmanned aircraft 20 to perform takeoff and landing on both sides in the width direction Y. Also, the second aircraft holding section 44b is configured to enable the unmanned aircraft 20 to perform takeoff and landing on both sides in the width direction Y.

Figure 5:
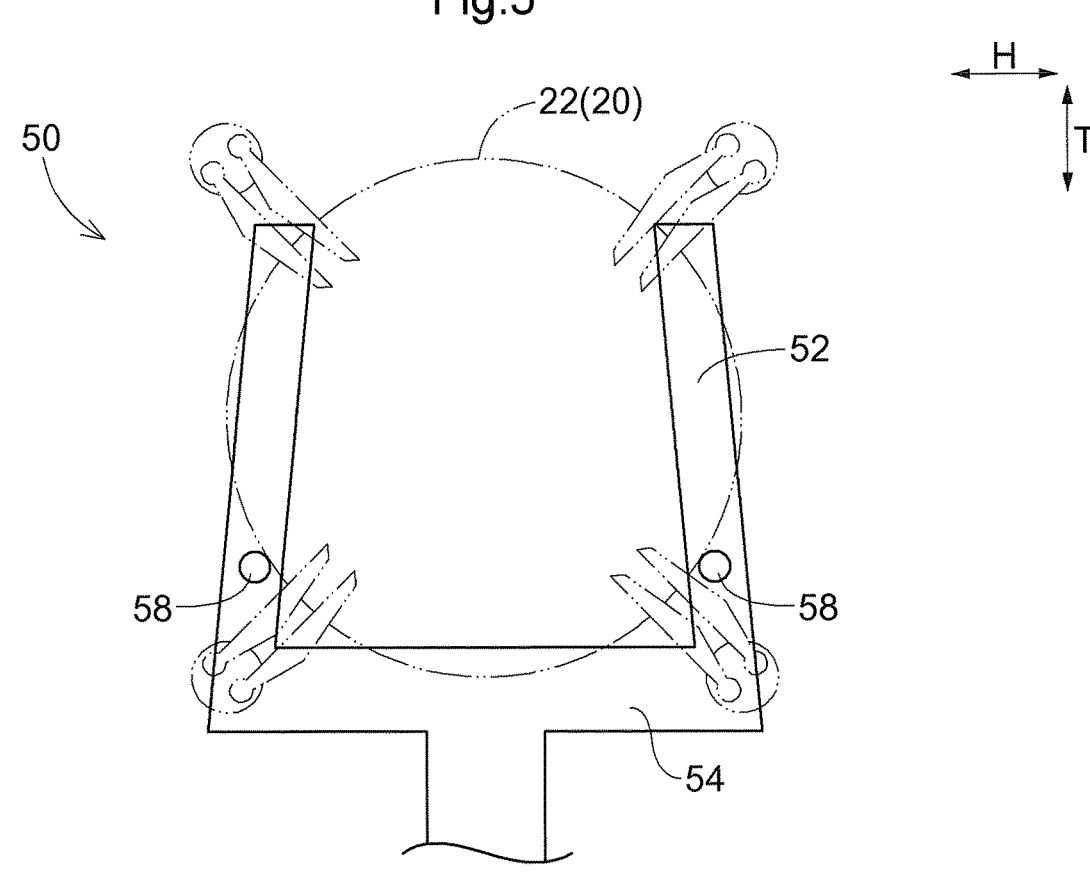
FIG. 5 is an enlarged view showing an example of support members shown in FIG. 2.
Figure 6:
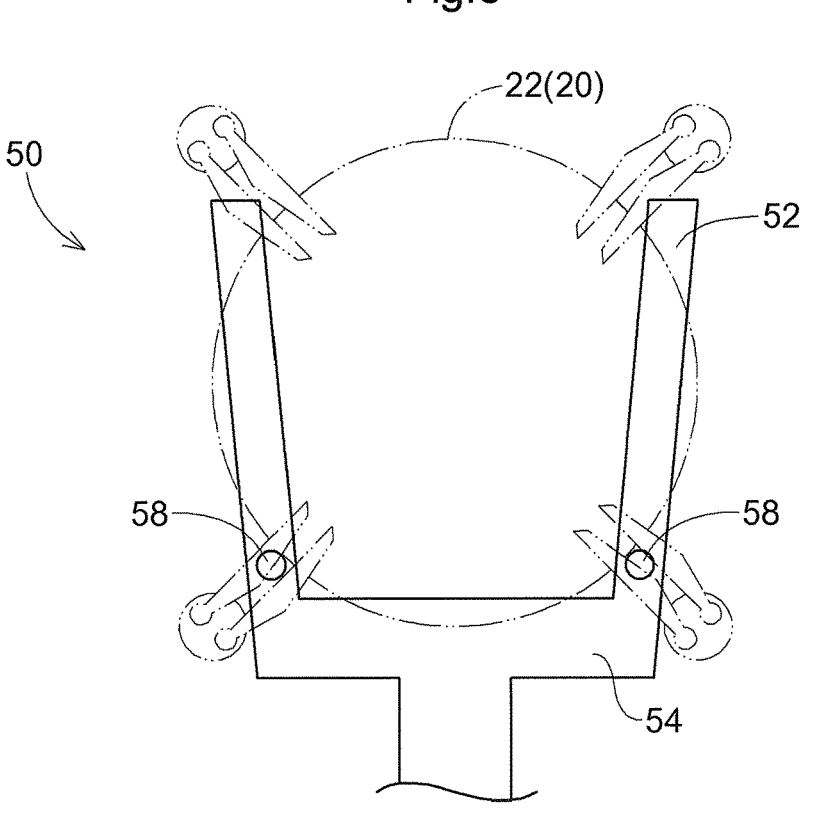
FIG. 6 is an enlarged view showing another example of the support members shown in FIG. 2.
Figure 7:
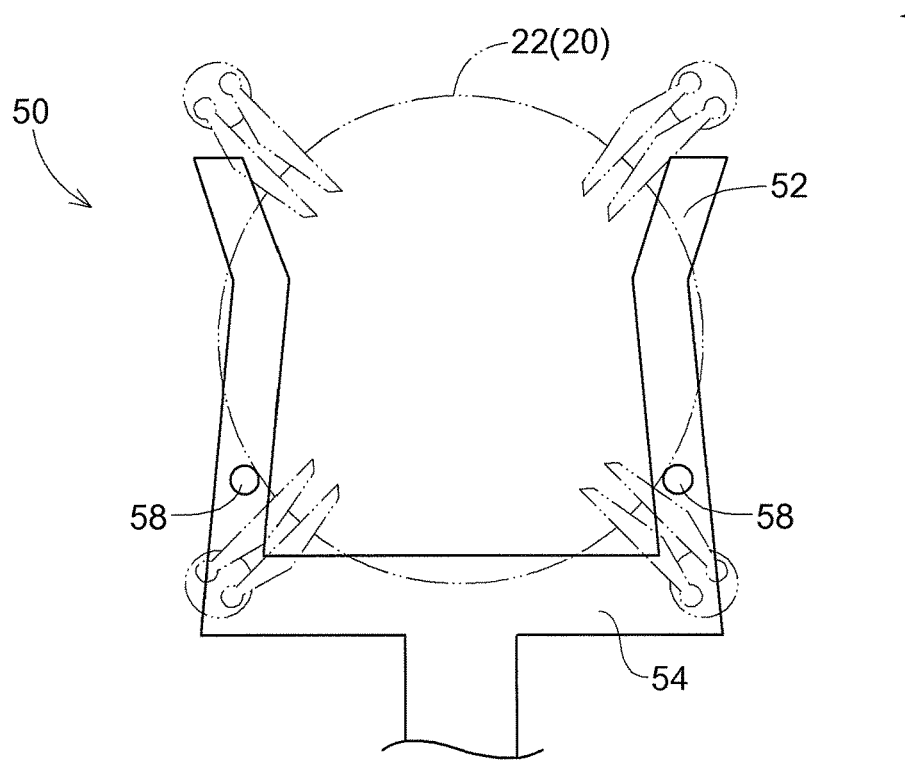
FIG. 7 is an enlarged view showing still another example of the support members shown in FIG. 2.

FIGS. 5, 6, and 7 are enlarged views each showing an upper surface of the support member 50 according to the present embodiment, showing examples of shapes different from each other. In the example shown in FIG. 5, the two insertion sections 52 have an interval therebetween that is reduced toward the distal end side. In this case, the unmanned aircraft 20 is less likely to be dislodged from the support member 50. In the example shown in FIG. 6, the two insertion sections 52 have an interval therebetween that is increased toward the distal end side. In this case, landing of the unmanned aircraft 20 can be easily performed. In the example shown in FIG. 7, the two insertion sections 52 have an interval therebetween that is increased toward the distal end side, and have, at a portion between a distal end portion and a proximal end portion, a narrowed portion in which the interval between the insertion sections 52 is reduced. In this case, takeoff of the unmanned aircraft 20 can be easily performed, and the unmanned aircraft 20 is less likely to be dislodged from the support member 50. In the examples shown in FIGS. 5, 6, and 7, the proximal end-side restricting sections 58 may each function as a wireless power feeding section and a positioning section configured to perform positioning, which will be described later, for the unmanned aircraft 20.

Second Embodiment

Figure 8:
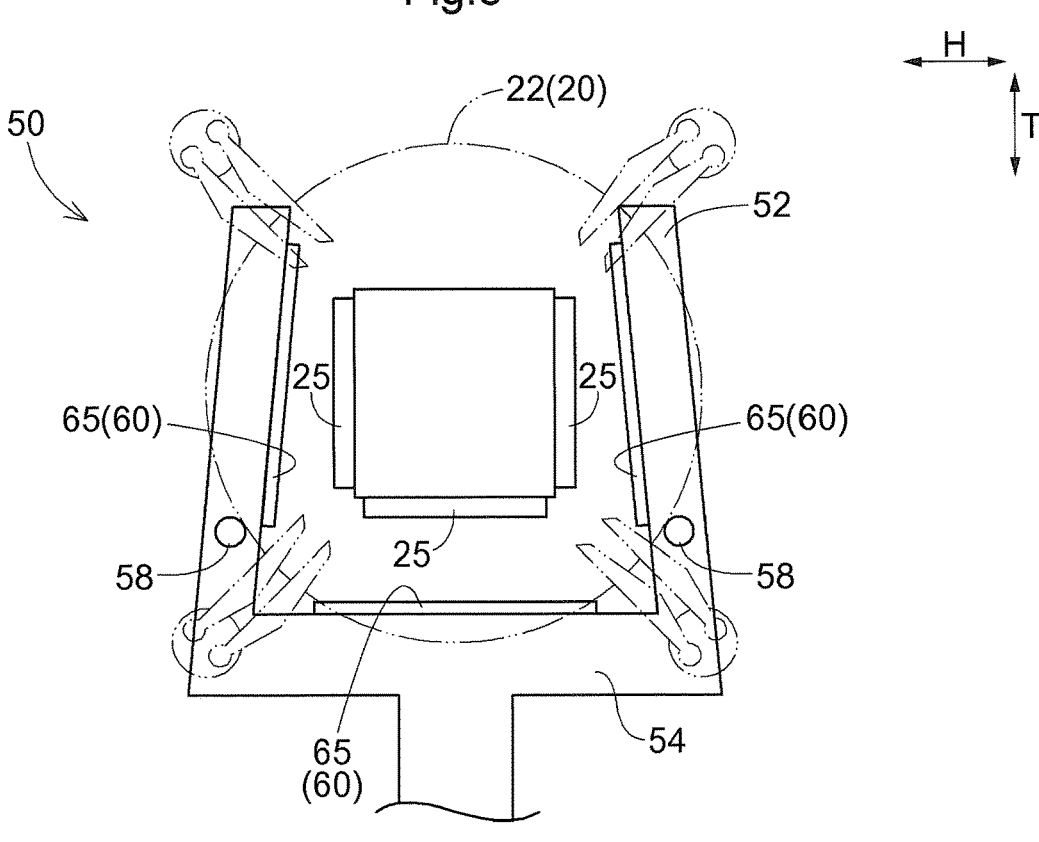
FIG. 8 is a diagram showing a support member of a transport system according to a second embodiment.

The following describes a transport system 10 according to a second embodiment with reference to the drawings. FIG. 8 is a diagram showing an upper surface of a support member 50 according to the present embodiment. The present embodiment differs from the first embodiment in that the power feeding section 60 does not include the connection section 61, the power feeding line 62, and the winding device 64, and that power is wirelessly supplied to the unmanned aircraft 20. The following description focuses on differences from the first embodiment. Aspects that are not specifically described are the same as those of the first embodiment.

In the present embodiment, the power feeding section 60 of the transport vehicle 40 wirelessly supplies power to the unmanned aircraft 20 held by the aircraft holding section 44. The unmanned aircraft 20 includes at least one power receiving section 25 that receives power from the power feeding section 60. The power received by the power receiving section 25 is stored in a storage battery of the unmanned aircraft 20, and the unmanned aircraft 20 flies using the power from the storage battery. The aircraft holding section 44 includes at least one proximal end-side restricting section 58 that functions as a positioning section that positions the unmanned aircraft 20 in order to position the power receiving section 25 relative to the power feeding section 60. This configuration makes it possible to wirelessly supply power to the unmanned aircraft 20 while the unmanned aircraft 20 is held by the aircraft holding section 44. As a result of the unmanned aircraft 20 being positioned by the proximal end-side restricting section 58 (positioning section), the power receiving section 25 can be positioned relative to the power feeding section 60, and it is thus possible to appropriately supply power.

In the illustrated example, the power feeding section 60 includes at least one power supply section 63 (see FIG. 1) and at least one wireless power feeding section 65 to which power is supplied from the power supply section 63, and the proximal end-side restricting section 58 functions as a positioning section that positions the unmanned aircraft 20 in order to position the power receiving section 25 relative to the wireless power feeding section 65. Each of the insertion sections 52 is provided with a wireless power feeding section 65. In addition, the coupling section 54 is provided with a wireless power feeding section 65. This configuration makes it possible to secure a large area for the wireless power feeding sections 65 on the support member 50. One of the insertion sections 52 may be provided with a wireless power feeding section 65, or only the coupling section 54 may be provided with a wireless power feeding section 65.

Third Embodiment

Figure 9:
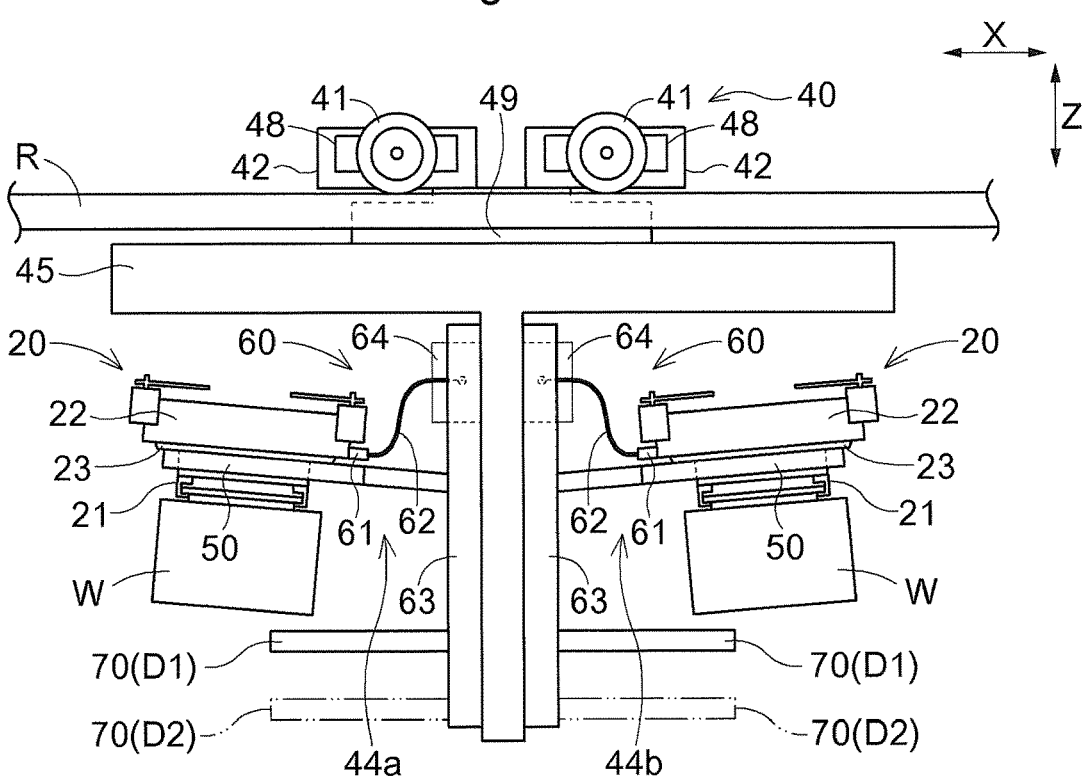
FIG. 9 is a side view of a transport system according to a third embodiment.
Figure 10:
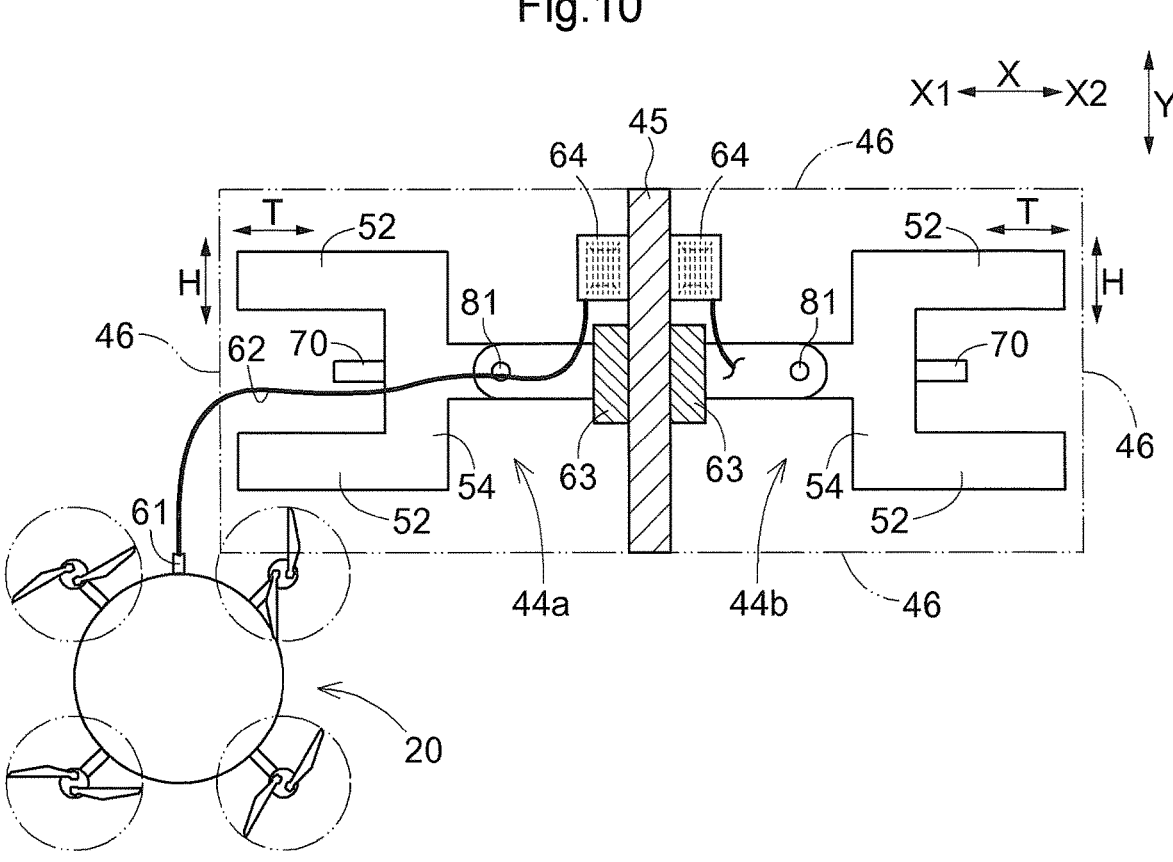
FIG. 10 is a diagram showing upper surfaces of aircraft holding sections shown in FIG. 9.

The following describes a transport system 10 according to a third embodiment with reference to the drawings. FIG. 9 is a diagram showing the transport system 10 according to the present embodiment. FIG. 10 is a diagram showing upper surfaces of aircraft holding sections 44 shown in FIG. 9. The following description focuses on differences from the first embodiment. Aspects that are not specifically described are the same as those of the first embodiment.

In the present embodiment, the housing section 45 includes openings 46 on both sides in the width direction Y and both sides in the traveling direction X. The first aircraft holding section 44a is configured to allow the unmanned aircraft 20 to perform takeoff and landing on both sides in the width direction Y and a first side X1 in the traveling direction X where the first aircraft holding section 44a is disposed relative to the second aircraft holding section 44b in the traveling direction X. The second aircraft holding section 44b is configured to allow the unmanned aircraft 20 to perform takeoff and landing on both sides in the width direction Y and a second side X2 in the traveling direction X that is opposite to the first side X1. With this configuration, the takeoff and landing directions of each of the two unmanned aircraft 20 can be secured over a wide range relative to the transport vehicle 40.

Fourth Embodiment

Figure 11:
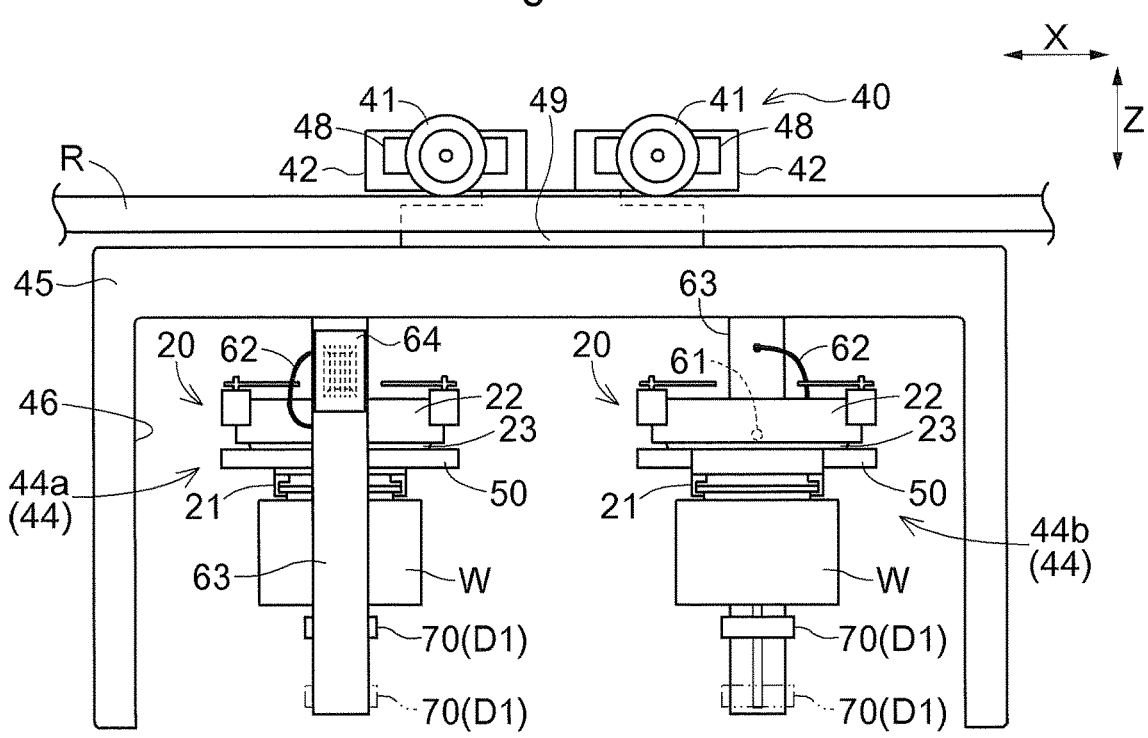
FIG. 11 is a side view of a transport system according to a fourth embodiment.
Figure 12:
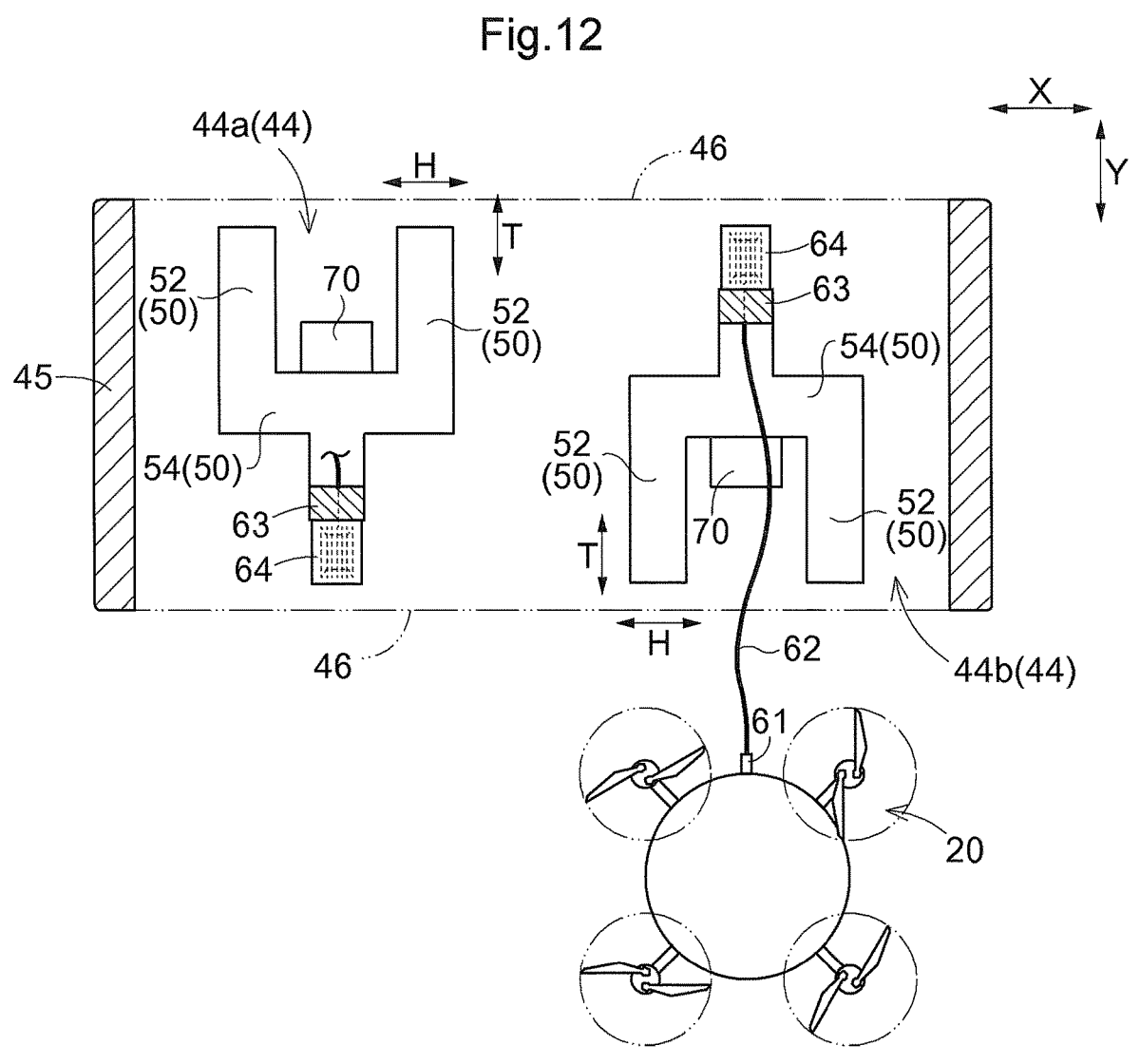

The following describes a transport system 10 according to a fourth embodiment with reference to the drawings. FIG. 11 is a diagram showing the transport system 10 according to the present embodiment. FIG. 12 is a diagram showing upper surfaces of aircraft holding sections 44 shown in FIG. 11. The present embodiment differs from the first embodiment in that the transport system 10 does not include the holding section movement mechanism 81 and the extension and retraction mechanism 82. The following description focuses on differences from the first embodiment. Aspects that are not specifically described are the same as those of the first embodiment.

In the present embodiment, the transport vehicle 40 includes a plurality of aircraft holding sections 44 arranged in the traveling direction X, and each of the plurality of aircraft holding sections 44 is configured to allow the unmanned aircraft 20 to perform takeoff and landing on only one side in the width direction Y. With this configuration, the takeoff and landing directions of the unmanned aircraft 20 relative to the respective aircraft holding sections 44 are determined, and therefore the configuration of the aircraft holding sections 44 can be easily simplified. In the illustrated example, the first aircraft holding section 44a is configured to allow the unmanned aircraft 20 to perform takeoff and landing on one side in the width direction Y, and the second aircraft holding section 44b is configured to allow the unmanned aircraft 20 to perform takeoff and landing on the other side in the width direction Y. Note that both the first aircraft holding section 44a and the second aircraft holding section 44b may be configured to allow the unmanned aircraft 20 to perform takeoff and landing on one side in the width direction Y.

Fifth Embodiment

Figure 13:
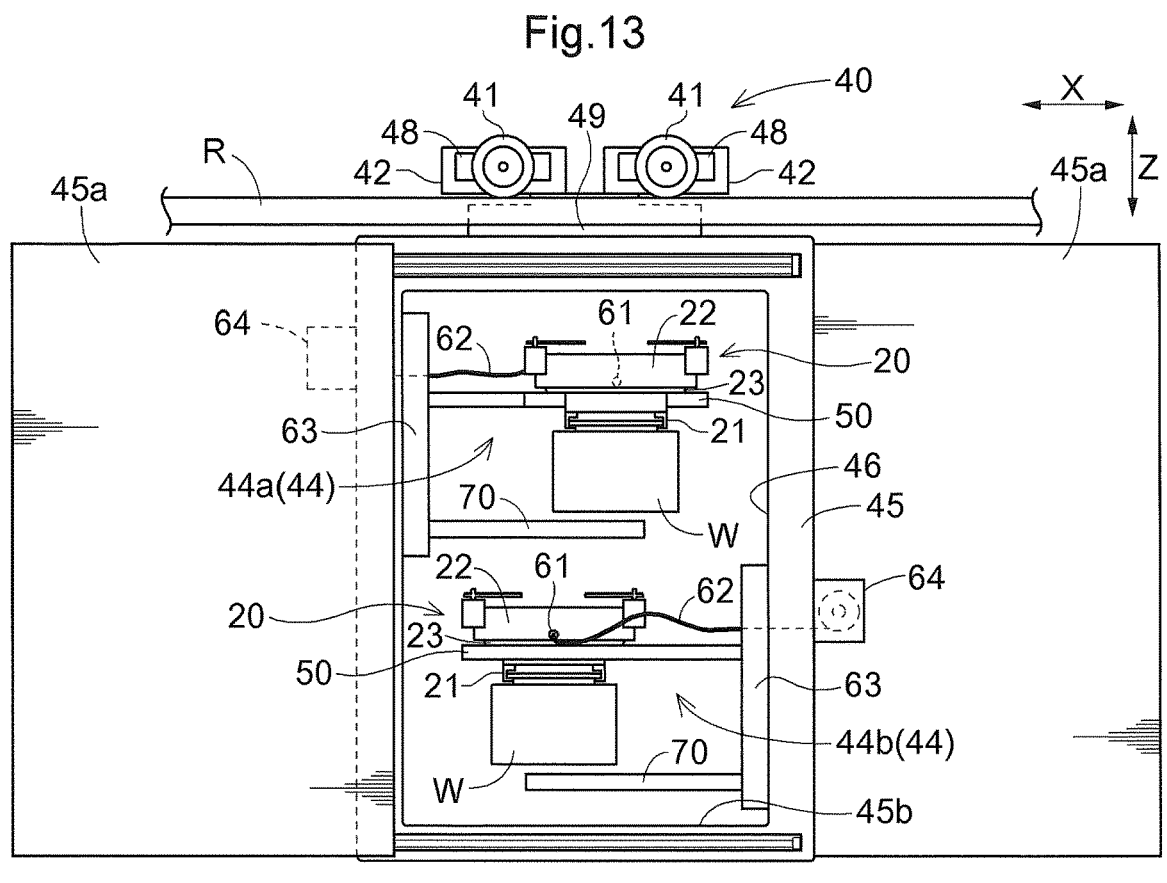
FIG. 13 is a side view of a transport system according to a fifth embodiment.
Figure 14:
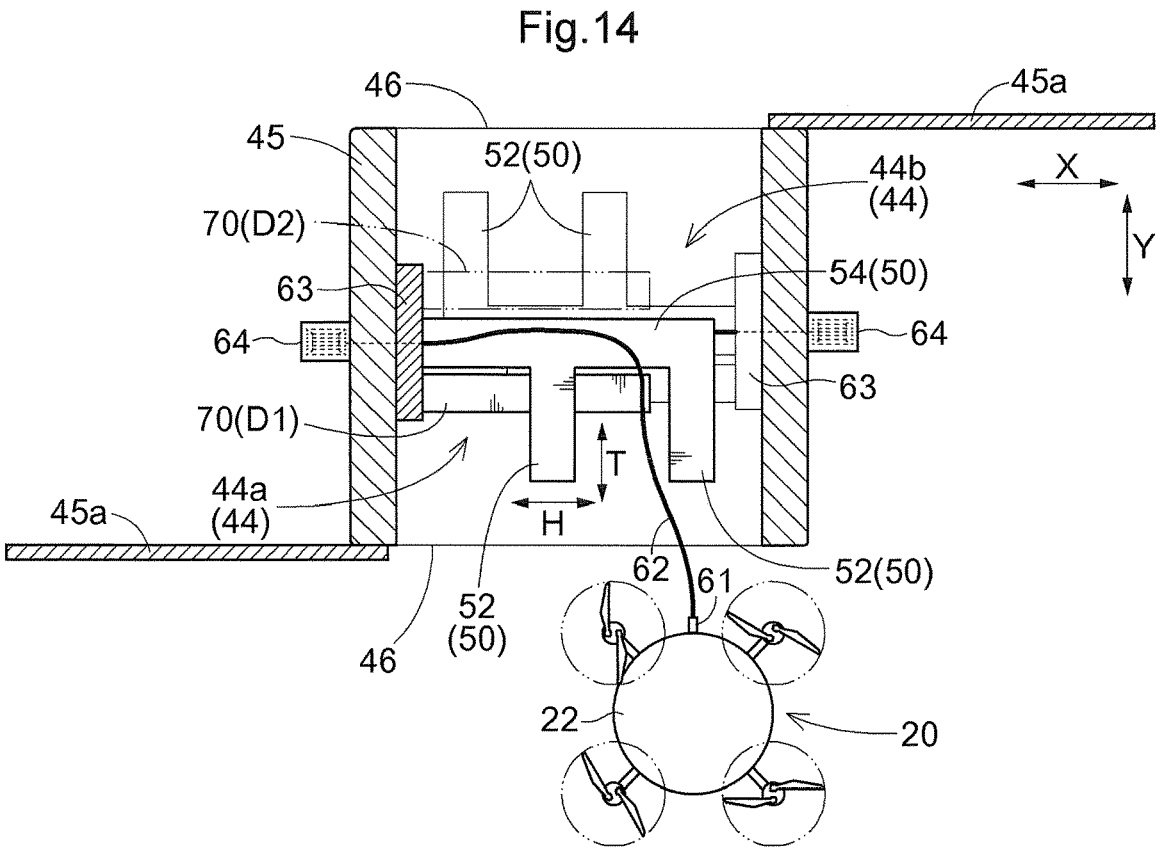
FIG. 14 is a diagram showing upper surfaces of aircraft holding sections shown in FIG. 13.

The following describes a transport system 10 according to a fifth embodiment with reference to the drawings. FIG. 13 is a diagram showing the transport system 10 according to the present embodiment. FIG. 14 is a diagram showing upper surfaces of aircraft holding sections 44 shown in FIG. 13. The present embodiment differs from the first embodiment in that the transport system 10 does not include the holding section movement mechanism 81 and the extension and retraction mechanism 82. The following description focuses on differences from the first embodiment. Aspects that are not specifically described are the same as those of the first embodiment.

In the present embodiment, the transport vehicle 40 includes a plurality of aircraft holding sections 44 arranged in the vertical direction Z, and each of the plurality of aircraft holding sections 44 is configured to allow the unmanned aircraft 20 to perform takeoff and landing on only one side in the width direction Y. In the illustrated example, the first aircraft holding section 44a is configured to allow the unmanned aircraft 20 to perform takeoff and landing on one side in the width direction Y, and the second aircraft holding section 44b is configured to allow the unmanned aircraft 20 to perform takeoff and landing on the other side in the width direction Y. The orientation of the fall restriction member 70 is changed between the restricting orientation D1 and the withdrawn orientation D2 by moving the fall restriction member 70 in the width direction Y. In the present embodiment, the housing section 45 includes opening and closing doors 45*a* capable of opening and closing the corresponding openings 46. In addition, the housing section 45 includes a lower frame 45*b*. Examples of the lower frame 45*b* include a floor and a beam. With this configuration, entry of dust or the like into the housing section 45 can be easily prevented. In addition, the strength of the opening and closing portions of the opening and closing doors 45*a* can be easily secured. In the illustrated example, the opening and closing doors 45*a* are sliding doors.

Sixth Embodiment

Figure 15:
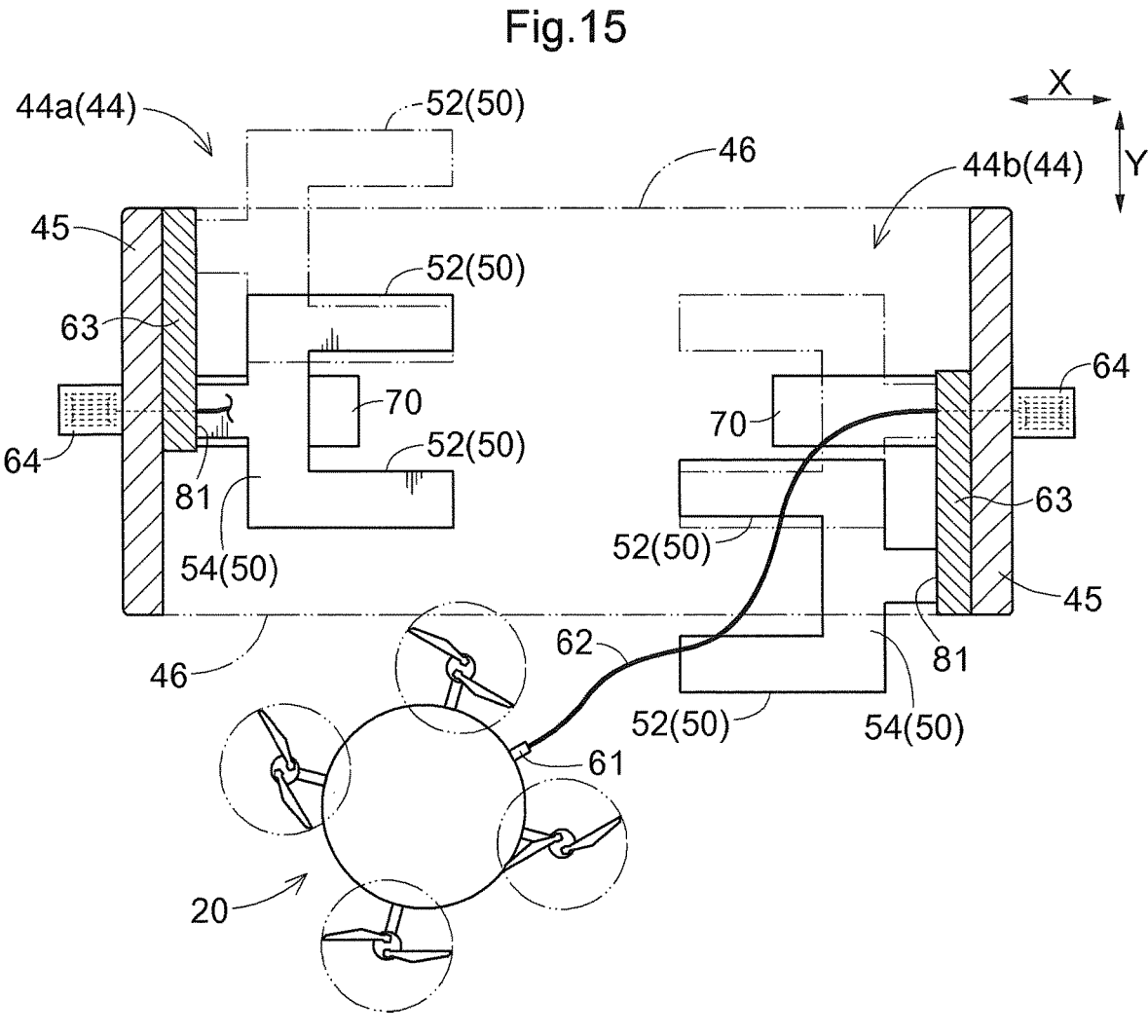
FIG. 15 is a diagram showing support members of a transport system according to a sixth embodiment.

The following describes a transport system 10 according to a sixth embodiment with reference to the drawings. FIG. 15 is a diagram showing the transport system 10 according to the present embodiment, showing upper surfaces of aircraft holding sections 44. The present embodiment differs from the first embodiment in that the transport system 10 does not include the orientation changing mechanism 72. The following description focuses on differences from the first embodiment. Aspects that are not specifically described are the same as those of the first embodiment.

In the present embodiment, the holding section movement mechanism 81 is configured to move the aircraft holding section 44 in the width direction Y. The housing section 45 has, on both sides in the width direction Y, openings 46 through which the unmanned aircraft 20 passes while performing takeoff and landing, and the holding section movement mechanism 81 is configured to change the orientation of the aircraft holding section 44 between a retracted state in which the aircraft holding section 44 does not protrude from the housing section 45 in a vertical view, and a protruding state in which a portion of the aircraft holding section 44 protrudes to a position that does not overlap the housing section 45 in a vertical view. With this configuration, the holding section movement mechanism 81 can function as the extension and retraction mechanism 82, thus making it possible to easily perform takeoff and landing of the unmanned aircraft 20.

In the present embodiment, the transport vehicle 40 includes a plurality of aircraft holding sections 44 arranged in the traveling direction X, and each of the plurality of aircraft holding sections 44 is moved in the width direction Y by the holding section movement mechanism 81 in such a manner as to allow the unmanned aircraft 20 to perform takeoff and landing on only one side in the width direction Y. In the illustrated example, the holding section movement mechanism 81 is configured to allow at least a portion of the first aircraft holding section 44*a* to protrude to a position that does not overlap the housing section 45 in a vertical view on one side in the width direction Y, and allow at least a portion of the second aircraft holding section 44*b* to protrude to a position at that does not overlap the housing section 45 in a vertical view on the other side in the width direction Y.

Other Embodiments

Next, other embodiments of the transport system 10 will be described.
  (1) The above embodiments have described, as an example, a configuration in which the unmanned aircraft 20 includes the body 22 at a position located above the article holding section 21. However, the present disclosure is not limited to such an example, and the unmanned aircraft 20 may include the body 22 at a position located below the article holding section 21.
  (2) The above embodiments have described, as an example, a configuration in which the transport vehicle 40 includes the support member 50. However, the present disclosure is not limited to such an example. For example, it is possible to adopt a configuration in which the body 22 of the unmanned aircraft 20 is suspended by a suspension hanger instead of using the support member 50. The pair of insertion sections 52 of the support member 50 may be inclined in such a manner as to be lower toward a side where the unmanned aircraft 20 exits and enters during takeoff and landing. It is also possible to adopt a configuration in which only one insertion section 52 of the support member 50 is inserted into an insertion target section of the unmanned aircraft 20. The support member 50 need not include the positioning section (proximal end-side restricting section 58).
  (3) The above embodiments have described, as an example, a configuration in which the transport vehicle 40 is an overhead transport vehicle including the fall restriction member 70. However, the present disclosure is not limited to such an example. For example, the transport vehicle 40 need not include the fall restriction member 70. The transport vehicle 40 may be a transport vehicle that does not include the wheels 41, the electric motor 48, and the regenerative power recovery section 49.
  (4) The first to fifth embodiments have described, as an example, a configuration in which the transport vehicle 40 includes the orientation changing mechanism 72. However, the present disclosure is not limited to such an example. For example, in the first to fifth embodiments, the transport vehicle 40 need not include the orientation changing mechanism 72.
  (5) The first to fifth embodiments have described, as an example, a configuration in which the transport vehicle 40 includes the holding section movement mechanism 81 configured to cause the aircraft holding section 44 to pivot about the pivot shaft. However, the present disclosure is not limited to such an example. For example, in the first to fifth embodiments, the transport vehicle 40 may include a holding section movement mechanism 81 configured to move the aircraft holding section 44 in the width direction Y or the traveling direction X. In the first to fifth embodiments, the transport vehicle 40 need not include both the holding section movement mechanism 81 and the extension and retraction mechanism 82.
  (6) The fifth embodiment has described, as an example, a configuration in which the housing section 45 includes the opening and closing doors 45*a*, which are sliding doors, and the lower frame 45*b*. However, the present disclosure is not limited to such an example. For example, in the fifth embodiment, the housing section 45 need not include the opening and closing doors 45*a* and the lower frame 45*b*. In the first to fourth and sixth embodiments, the housing section 45 may include the opening and closing doors 45*a*. In the first to fourth and sixth embodiments, the housing section 45 may include the lower frame 45*b*. The opening and closing doors 45*a* may be double doors or the like.
  (7) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

Outline of the Embodiments

The transport system described above will be described below.

A transport system according to the present disclosure includes: an unmanned aircraft including an article holding section configured to hold and release an article; and a transport vehicle that includes at least one aircraft holding section configured to hold the unmanned aircraft, and that is configured to travel along a predetermined travel path, wherein the at least one aircraft holding section is further configured to (i) hold the unmanned aircraft in either one of an article holding state in which the unmanned aircraft is holding the article using the article holding section, and an article non-holding state in which the unmanned aircraft is not holding the article using the article holding section, and (ii) allow the unmanned aircraft in either one of the article holding state and the article non-holding state to take off and land.

With this configuration, the article can be transported from the transport vehicle to a destination using the unmanned aircraft, and therefore the article can also be transported to a destination away from the travel path of the transport vehicle. To put it conversely, there is no need to provide the travel path of the transport vehicle in proximity to all assumed destinations. Accordingly, it is possible to reduce the cost of installing the travel path, and increase the efficiency of transporting the article and the unmanned aircraft using the transport vehicle. In the case of transporting the article to a destination, the unmanned aircraft in the article holding state is held on the transport vehicle, and the transport vehicle is caused to travel to the vicinity of the destination, from where the unmanned aircraft is caused to take off while being in the article holding state, thus transporting the article to the destination. In this manner, the unmanned aircraft in the article holding state can be held on the transport vehicle, and it is therefore possible to easily shorten the time from the arrival of the transport vehicle at the vicinity of the destination to the takeoff of the unmanned aircraft. Accordingly, it is possible to increase the efficiency of transporting the article. Also, the unmanned aircraft that has transported the article to the destination is thereafter held on the transport vehicle again, whereby the unmanned aircraft can be transported to a different location, including, for example, a receiving location of the article.

As an aspect, it is preferable that the unmanned aircraft further includes a body located above the article held by the article holding section, the article holding section holds the article in a suspended state, the at least one aircraft holding section includes a support member configured to support, from below, the body at a position located above the article held by the article holding section, and the transport vehicle further includes a fall restriction member that is disposed at a position located below the article held by the article holding section and overlapping the article in a vertical view, and that is configured to restrict falling of the article.

This configuration allows the transport vehicle to appropriately hold the unmanned aircraft in the article holding state, and also to restrict falling of the article even if the article is released unintentionally by the article holding section.

As an aspect, it is preferable that the transport vehicle further includes an orientation changing mechanism configured to change an orientation of the fall restriction member between (i) a restricting orientation in which the fall restriction member restricts falling of the article held by the article holding section of the unmanned aircraft, and (ii) a withdrawn orientation in which the fall restriction member does not interfere with the unmanned aircraft while the unmanned aircraft performs takeoff and landing.

This configuration makes it possible to easily avoid interference between the fall restriction member and the article held by the unmanned aircraft during takeoff and landing of the unmanned aircraft, and also easily increase the effect of restricting falling of the article by keeping the fall restriction member in the restricting orientation to be positioned close to the article while the unmanned aircraft is held by the aircraft holding section.

As an aspect, it is preferable that the body of the unmanned aircraft includes a supported section configured to be supported by the support member, the support member includes: a pair of insertion sections configured to be inserted between the article and the supported section in a vertical direction; and a coupling section coupling the insertion sections to each other, and the insertion sections each extend in a relative movement direction in which the unmanned aircraft moves relative to the support member while performing takeoff and landing, and are coupled to each other by the coupling section in such a manner as to be spaced apart from each other in a relative movement orthogonal direction that is orthogonal to the relative movement direction in the vertical view.

With this configuration, the unmanned aircraft can be supported by the support member by moving the unmanned aircraft relative to the support member in such a manner that the article holding section is sandwiched between the two insertion sections.

As an aspect, it is preferable that the insertion sections are inclined in such a manner as to be higher on a side in the relative movement direction where the unmanned aircraft exits and enters during takeoff and landing.

With this configuration, the unmanned aircraft is less likely to be dislodged from the support member while the transport vehicle is traveling.

As an aspect, it is preferable that the transport vehicle further includes an extension and retraction mechanism configured to cause the at least one aircraft holding section to extend and retract at least in a horizontal direction.

With this configuration, even when a portion of the transport vehicle is disposed in such a manner as to cover the upper side of the aircraft holding section in the retracted state, the aircraft holding section can be caused to protrude to a position that does not overlap the portion of the transport vehicle in a vertical view. Accordingly, takeoff and landing of the unmanned aircraft can be easily performed.

As an aspect, it is preferable that the transport vehicle is an overhead transport vehicle configured to travel along the travel path installed along a ceiling in a room, and further includes: a travel section including a wheel; and a housing section disposed below the travel section and configured to house the unmanned aircraft held by the at least one aircraft holding section, with a traveling direction being a direction extending along the travel path, and a width direction being a direction orthogonal to the traveling direction in the vertical view, the housing section includes, on both sides in at least the width direction, openings through which the unmanned aircraft passes while performing takeoff and landing.

This configuration allows the unmanned aircraft to takeoff from and land on also an overhead transport vehicle including a travel section located above the housing section, and a ceiling located above the travel section.

As an aspect, it is preferable that the at least one aircraft holding section includes a plurality of aircraft holding sections arranged in the traveling direction, and each of the plurality of aircraft holding sections is configured to allow the unmanned aircraft to perform takeoff and landing on only one side in the width direction.

With this configuration, the takeoff and landing directions of the unmanned aircraft relative to the respective aircraft holding sections are determined, and it is therefore possible to easily simplify the configuration of the aircraft holding sections.

As an aspect, it is preferable that the transport vehicle includes: a first aircraft holding section that is a first one of the aircraft holding sections arranged in the traveling direction; and a second aircraft holding section that is a second one of the aircraft holding sections, the housing section further includes the openings on both sides in the traveling direction, the first aircraft holding section is configured to allow the unmanned aircraft to perform takeoff and landing on a first side in the traveling direction where the first aircraft holding section is disposed relative to the second aircraft holding section in the traveling direction, and on both sides in the width direction, and the second aircraft holding section is configured to allow the unmanned aircraft to perform takeoff and landing on a second side in the traveling direction that is opposite to the first side, and on both sides in the width direction.

With this configuration, the direction of takeoff and landing of each of the two unmanned aircraft can be secured over a wide range relative to the transport vehicle.

As an aspect, it is preferable that the transport vehicle further includes: a travel section including a wheel and an electric motor configured to drive the wheel; a regenerative power recovery section configured to recover power obtained by regenerative braking of the electric motor during deceleration of the travel section; and a power feeding section configured to supply power to the unmanned aircraft held by the at least one aircraft holding section, and the power recovered by the regenerative power recovery section is supplied to the unmanned aircraft from the power feeding section.

With this configuration, power can be supplied to the unmanned aircraft using the energy recovered during deceleration of the transport vehicle. Accordingly, the energy efficiency of the transport system can be easily increased.

As an aspect, it is preferable that the transport vehicle further includes: a power feeding line including a connection section configured to be connected to the unmanned aircraft; a power supply section configured to supply power to the unmanned aircraft via the power feeding line; and a winding device configured to wind and unwind the power feeding line.

With this configuration, it is possible to constantly supply power to the unmanned aircraft. Accordingly, a long flight time of the unmanned aircraft can be easily secured.

As an aspect, it is preferable that the transport vehicle further includes a power feeding section configured to wirelessly supply power to the unmanned aircraft held by the at least one aircraft holding section, the unmanned aircraft further includes a power receiving section configured to receive power from the power feeding section, and the at least one aircraft holding section includes a positioning section configured to position the unmanned aircraft in order to position the power receiving section relative to the power feeding section.

With this configuration, it is possible to supply power to the unmanned aircraft while the unmanned aircraft is held by the aircraft holding section. Furthermore, the power receiving section is positioned relative to the power feeding section as a result of the unmanned aircraft being positioned by the positioning section. Accordingly, it is possible to appropriately supply power.

DESCRIPTION OF REFERENCE SIGNS

10: Transport system
20: Unmanned aircraft
21: Article holding section
22: Body
23: Supported section
25: Power receiving section
40: Transport vehicle
41: Wheel
42: Travel section
44: Aircraft holding section
44*a*: First aircraft holding section
44*b*: Second aircraft holding section
45: Housing section
46: Opening
48: Electric motor
49: Regenerative power recovery section
50: Support member
52: Insertion section
54: Coupling section
60: Power feeding section
61: Connection section
62: Power feeding line
63: Power supply section
64: Winding device
70: Fall restriction member
72: Orientation changing mechanism
82: Extension and retraction mechanism

What is claimed is:

1. A transport system comprising:
an unmanned aircraft comprising an article holding section configured to hold and release an article; and
a transport vehicle configured to travel along a predetermined travel path,
wherein the transport vehicle comprises a housing section having a roof, at least one wall and an opening through which the unmanned aircraft passes while performing takeoff and landing, and a fork-shaped aircraft holding section configured to hold the unmanned aircraft,
wherein the housing section is configured to house the unmanned aircraft held by the aircraft holding section, and
wherein the at least one aircraft holding section is further configured to (i) hold the unmanned aircraft in either one of an article holding state in which the unmanned aircraft is holding the article using the article holding section, and an article non-holding state in which the unmanned aircraft is not holding the article using the article holding section, and (ii) allow the unmanned aircraft in either one of the article holding state and the article non-holding state to take off and land.

2. The transport system according to claim 1, wherein:

the unmanned aircraft further comprises a body located above the article held by the article holding section, the article holding section holds the article in a suspended state, the at least one aircraft holding section comprises a support member configured to support, from below, the body at a position located above the article held by the article holding section, and the transport vehicle further comprises a fall restriction member that is disposed at a position located below the article held by the article holding section and overlapping the article in a vertical view, and that is configured to restrict falling of the article.

3. The transport system according to claim 2, wherein the transport vehicle further comprises an orientation changing mechanism configured to change an orientation of the fall restriction member between (i) a restricting orientation in which the fall restriction member restricts falling of the article held by the article holding section of the unmanned aircraft, and (ii) a withdrawn orientation in which the fall restriction member does not interfere with the unmanned aircraft while the unmanned aircraft performs takeoff and landing.

4. The transport system according to claim 2, wherein:

the body of the unmanned aircraft comprises a supported section configured to be supported by the support member, the support member comprises:

a pair of insertion sections configured to be inserted between the article and the supported section in a vertical direction; and a coupling section coupling the insertion sections to each other, and the insertion sections each extend in a relative movement direction in which the unmanned aircraft moves relative to the support member while performing takeoff and landing, and are coupled to each other by the coupling section in such a manner as to be spaced apart from each other in a relative movement orthogonal direction that is orthogonal to the relative movement direction in the vertical view.

5. The transport system according to claim 4, wherein the insertion sections are inclined in such a manner as to be higher on a side in the relative movement direction where the unmanned aircraft exits and enters during takeoff and landing.

6. The transport system according to claim 1, wherein the transport vehicle further comprises an extension and retraction mechanism configured to cause the at least one aircraft holding section to extend and retract at least in a horizontal direction.

7. The transport system according to claim 1, wherein the transport vehicle further comprises:

a travel section comprising a wheel and an electric motor configured to drive the wheel;

a regenerative power recovery section configured to recover power obtained by regenerative braking of the electric motor during deceleration of the travel section; and a power feeding section configured to supply power to the unmanned aircraft held by the at least one aircraft holding section, and wherein the power recovered by the regenerative power recovery section is supplied to the unmanned aircraft from the power feeding section.

8. The transport system according to claim 1, wherein the transport vehicle further comprises:

a power feeding line comprising a connection section configured to be connected to the unmanned aircraft;

a power supply section configured to supply power to the unmanned aircraft via the power feeding line; and a winding device configured to wind and unwind the power feeding line.

9. The transport system according to claim 1, wherein:

the transport vehicle further comprises a power feeding section configured to wirelessly supply power to the unmanned aircraft held by the at least one aircraft holding section, the unmanned aircraft further comprises a power receiving section configured to receive power from the power feeding section, and the at least one aircraft holding section comprises a positioning section configured to position the unmanned aircraft in order to position the power receiving section relative to the power feeding section.

10. The transport system according to claim 1, wherein the aircraft holding section is disposed to protrude from the roof or the wall.

11. The transport system according to claim 1, wherein the roof overlaps the whole unmanned aircraft housed by the housing section in a vertical view.

12. The transport system according to claim 1, wherein:

a traveling direction is a direction extending along the travel path, and the wall is provided at one or both sides of the travel direction and overlaps the whole unmanned aircraft housed by the housing section when viewed along the travel direction.

13. The transport system according to claim 1, wherein the transport vehicle comprises a plurality of the housing section each of which his configured to house the fork-shaped aircraft holding section.

14. A transport system comprising:

an unmanned aircraft comprising an article holding section configured to hold and release an article; and a transport vehicle configured to travel along a predetermined travel path, wherein the transport vehicle comprises a housing section having a roof, at least one wall and an opening through which the unmanned aircraft passes while performing takeoff and landing, and an aircraft holding section configured to hold the unmanned aircraft, wherein the housing section is configured to house the unmanned aircraft held by the aircraft holding section, wherein the at least one aircraft holding section is further configured to (i) hold the unmanned aircraft in either one of an article holding state in which the unmanned aircraft is holding the article using the article holding section, and an article non-holding state in which the unmanned aircraft is not holding the article using the article holding section, and (ii) allow the unmanned aircraft in either one of the article holding state and the article non-holding state to take off and land, wherein the transport vehicle is an overhead transport vehicle configured to travel along the travel path installed along a ceiling in a room, and further comprises:

a travel section comprising a wheel, wherein a traveling direction is a direction extending along the travel path, and a width direction is a direction orthogonal to the traveling direction in the vertical view, and wherein the housing section is disposed below the travel section and comprises, on both sides in at least the width direction, the openings.

15. The transport system according to claim 14, wherein the at least one aircraft holding section comprises a plurality of aircraft holding sections arranged in the traveling direction, and wherein each of the plurality of aircraft holding sections is configured to allow the unmanned aircraft to perform takeoff and landing on only one side in the width direction.

16. The transport system according to claim 14, wherein the transport vehicle comprises:

a first aircraft holding section that is a first one of the aircraft holding sections arranged in the traveling direction; and a second aircraft holding section that is a second one of the aircraft holding sections, the housing section further comprises the openings on both sides in the traveling direction, the first aircraft holding section is configured to allow the unmanned aircraft to perform takeoff and landing on a first side in the traveling direction where the first aircraft holding section is disposed relative to the second aircraft holding section in the traveling direction, and on both sides in the width direction, and the second aircraft holding section is configured to allow the unmanned aircraft to perform takeoff and landing on a second side in the traveling direction that is opposite to the first side, and on both sides in the width direction.

17. A transport system comprising:

an unmanned aircraft comprising an article holding section configured to hold and release an article; and a transport vehicle configured to travel along a predetermined travel path, wherein the transport vehicle comprises a housing section having a roof, at least one wall and an opening through which the unmanned aircraft passes while performing takeoff and landing, and an aircraft holding section configured to hold the unmanned aircraft, wherein the housing section is configured to house the unmanned aircraft held by the aircraft holding section, wherein the at least one aircraft holding section is further configured to (i) hold the unmanned aircraft in either one of an article holding state in which the unmanned aircraft is holding the article using the article holding section, and an article non-holding state in which the unmanned aircraft is not holding the article using the article holding section, and (ii) allow the unmanned aircraft in either one of the article holding state and the article non-holding state to take off and land, wherein a traveling direction is a direction extending along the travel path, and a width direction is a direction orthogonal to the traveling direction in the vertical view, and wherein the transport vehicle comprises a plurality of the aircraft holding sections aligned along the traveling direction, and the plurality of the aircraft holding sections are configured to allow the unmanned aircrafts held respectively by the plurality of the aircraft holding sections to perform takeoff and landing on opposite sides in the traveling direction or the width direction.

* * * * *